United States Patent [19]

Finley et al.

[11] Patent Number: 5,830,252

[45] Date of Patent: Nov. 3, 1998

[54] ALKALI METAL DIFFUSION BARRIER LAYER

[75] Inventors: James J. Finley, Pittsburgh; F. Howard Gillery, Allison Park, both of Pa.

[73] Assignee: PPG Industries, Inc., Pittsburgh, Pa.

[21] Appl. No.: 597,543

[22] Filed: Feb. 1, 1996

Related U.S. Application Data

[63] Continuation-in-part of Ser. No. 330,148, Oct. 4, 1994, abandoned.

[51] Int. Cl.[6] .............................. C03C 17/23; C03C 14/34
[52] U.S. Cl. ............................ 65/60.5; 65/60.1; 65/60.53; 204/192.1; 204/192.12; 427/108; 427/126.2; 427/126.3
[58] Field of Search ...................................... 156/634, 656, 156/659.1, 145; 428/426, 428, 432, 433, 702; 65/60.5, 60.53, 60.1; 427/108, 126.2, 126.3; 204/192.1, 192.12

[56] References Cited

U.S. PATENT DOCUMENTS

| | | | |
|---|---|---|---|
| 4,238,276 | 12/1980 | Kinugawa | 156/634 |
| 4,497,700 | 2/1985 | Groth et al. | 204/192 P |
| 4,715,879 | 12/1987 | Schmitte et al. | 65/60.2 |
| 4,857,094 | 8/1989 | Groth et al. | 65/60.2 |
| 5,133,594 | 7/1992 | Haas | 359/275 |
| 5,165,972 | 11/1992 | Porter | 428/1 |

FOREIGN PATENT DOCUMENTS

| | | |
|---|---|---|
| 0 071 865 | 10/1985 | European Pat. Off. . |
| 0174 727 | 3/1986 | European Pat. Off. . |
| 0 304 234 | 2/1989 | European Pat. Off. . |
| 0 363 747 | 4/1990 | European Pat. Off. . |
| 0 436 741 | 7/1991 | European Pat. Off. . |
| 0 530 676 | 3/1993 | European Pat. Off. . |
| 0 705 801 | 4/1996 | European Pat. Off. . |
| 53/002517 | 1/1978 | Japan . |
| 58/009123 | 1/1983 | Japan . |
| 58/009124 | 1/1983 | Japan . |
| 476 180 | 7/1969 | Switzerland . |
| 95/11751 | 5/1995 | WIPO . |

OTHER PUBLICATIONS

Chaissac, M. et al. "Behavior of rf sputter deposited $SiO_2$ and $Al_2O_3$ diffusion barriers on float glass at 300°C in air", Glastech., vol. 66, No. 12, Dec. 1993, pp. 331–333.

Fehlner, F. P. et al. "Barrier Layers for low–sodium LCD substrate glasses", SID International Symposium Digest of Technical Papers, May 6–10, 1991, vol. 22, pp. 679–681.

Guanghui, F. U. et al., "The migration of alkali ions from glass substrates coated with sol–gel barrier films", Journal of Non–Crystalline Solids, Oct. 1989, pp. 454–457.

Zelazowska, E., "Study of Metal Oxide and Titanium Oxynitride Coatings on Soda–Lime Glass", Szklo I Ceramika, vol. 43, No. 6, (1992), pp. 2–7.

Primary Examiner—Nasser Ahmad
Attorney, Agent, or Firm—Donald C. Lepiane

[57] ABSTRACT

Amorphous metal oxide barrier layers of titanium oxide, zirconium oxide and zinc/tin oxide are effective as alkali metal ion barrier layers at thicknesses below 180 Angstroms. The amorphous metal oxide barrier layers are most effective when the density of the layer is equal to or greater than 90% of the crystalline density. The barrier layers prevent migration of alkali metal ions such as sodium ions from glass substrates into a medium e.g. electrolyte of a photochromic cell, liquid material of a liquid crystal display device contacting the glass surface. The properties of the medium, particularly electroconductive metal oxide coatings, are susceptible to deterioration by the presence of sodium ions migrating from the glass.

20 Claims, 4 Drawing Sheets

ALKALI METAL DIFFUSION BARRIER LAYER

CONTINUING APPLICATION INFORMATION

This application is a continuation-in-part application of U.S. patent application Ser. No. 08/330,148 filed on Oct. 4, 1994, now abandoned in the names of James J. Finley and F. Howard Gillery.

FIELD OF THE INVENTION

This invention relates to a barrier layer and, more particularly, to a barrier layer to prevent diffusion of alkali metal ions, such as sodium ions, from a glass substrate into a medium e.g. a coating such as an electroconductive coating.

DISCUSSION OF THE TECHNICAL PROBLEM

Alkali metal ions, e.g. sodium ions in glass, particularly at elevated temperatures, migrate from the surface of the glass into the medium overlaying the glass. For example, in liquid crystal display ("LCD") devices similar to the type disclosed in U.S. Pat. No. 5,165,972, the sodium ions in the surface of the glass substrate migrate into the liquid crystal material causing deterioration of the liquid crystal material. In electrochromic displays, the sodium ions migrate into coatings overlaying the surface of the glass substrate and/or into the electrolyte which causes deterioration of the coating and/or electrolyte. During fabrication of LCD devices and/or electrochromic devices, the glass substrate is heated to temperatures as high as 1100° F. (593° C.) to seal the devices; during such heating sodium ion migration is accelerate.

Unless hindered, the sodium ions migrate into the medium e.g. the electroconductive coating, the electrolyte and/or the liquid crystal material overlaying the surface of the glass substrate deteriorating the medium.

It is also believed that alkali metal ion migration, e.g. sodium ion migration, also causes deterioration of photocatalytic compositions of the type disclosed in International Application Publication No. WO 95/11751. In general, compositions include titanium dioxide or zinc oxide particles held together and to a glass substrate by a silicone binder. The surface can act as a biocidal agent under the application of light.

One technique to prevent or minimize alkali metal ion migration is to provide a barrier coating between the medium and the glass substrate.

U.S. Pat. No. 5,165,972 to Porter discloses barrier coatings to prevent migration of alkali metal ions from a glass surface. The barrier coating is deposited by pyrolysis of a silane gas on the glass surface above 600° C. in the presence of a gaseous electron donating compound. Oxygen from the glass is incorporated with silicon to form a transparent barrier coating up to 50 nanometers thick on the glass surface to prevent migration of alkali metal ions into overlying layers sensitive to alkali metal ions. Although the technique of Porter '972 is acceptable, there are drawbacks. For example, oxygenation by pyrolysis requires high energy inputs especially if the sheets have to be heated before coating making the process expensive.

U.S. Pat. No. 4,238,276 to Kinugawa discloses a barrier layer that includes silicon oxide, titanium oxide, aluminum oxide, zirconium oxide, magnesium oxide and nickel oxide. Kinugawa discloses silicon oxide barrier coating having a thickness of 1000 angstroms. Although the barrier coating disclosed by Kinugawa is acceptable, it has drawbacks. More particularly, depositing a 1000 Angstrom thick layer of silicon oxide by any technique is more expensive than depositing a silicon oxide layer less than 1000 Angstroms thick by the same process. Further, a thin silicon oxide layer of the type disclosed in Kinugawa may not act as an effective barrier.

European Patent Specification Publication No. 0 071 865 B to Mizuhashi et al. discloses a glass body having an alkali-containing glass substrate and a silicon oxide layer formed on its surface for preventing diffusion of alkali metal ions from the glass substrate. The silicon oxide layer has from 0.01 to 25 molar percent hydrogen bonded to silicon. Although the technique disclosed by Mizuhashi et al. appears to prevent alkali metal ion migration, there are drawbacks. More particularly, the barrier coating may trap hydrogen gas which may escape during fabrication/use of the product e.g. LCD devices. As can be appreciated, it is preferred not to have a coating that may randomly release hydrogen gas into a medium which may result in deterioration of the medium. Further, hydrogen that is chemically bonded in the coating may affect optical and mechanical properties of the coating.

As can be appreciated, it would be advantageous to provide a thin barrier layer that can be applied economically, and does not have the drawbacks/limitations of the presently available technology.

SUMMARY OF THE INVENTION

The present invention recognizes the desirability of utilizing a thin material as a diffusion barrier for alkali metal ions such as sodium ions. Although the prior art suggests that the refractive index of such a diffusion barrier should match the refractive index of the substrate as closely as possible, thus selecting silica for glass substrates, in accordance with the present invention, very thin layers of metal oxides such as zirconium oxide, titanium oxide and zinc/tin oxide are produced as effective diffusion barriers for sodium ions without compromising optical properties of the coated glass.

In general the present invention relates to an article having a medium e.g. electroconductive coating, electrolyte of a photochromic device and/or liquid material of liquid crystal display over and spaced from the surface of a glass substrate. A barrier layer e.g. zirconium oxide, titanium oxide or zinc/tin oxide is deposited by magnetron sputtering over the glass substrate to provide a barrier layer between the medium and the glass substrate. The barrier layer or film is amorphous and has a density equal to or greater than 90% of the crystalline density of the metal oxide of the film. While zirconium oxide, titanium oxide and zinc/tin oxide have refractive indices significantly higher than the refractive index of typical glass substrates, because they are very thin there is no deleterious effect on the optical properties of the coated glass substrate.

The glass substrate having the barrier layer may be used as a component of a liquid crystal display cell, of a photochromic device and/or of a photocatalytic device.

Although zinc/tin oxide deposited according to the invention is effective as an alkali net ion barrier, it is more soluble in etchants than titanium oxide and zirconium oxide.

The invention also relates to a method of making the article.

DESCRIPTION OF PREFERRED EMBODIMENTS

An effective alkali metal ion barrier layer is preferably stable, and remains impermeable to alkali metal ion diffusion even at elevated temperatures, e.g. as high as 1100° F. (593° C.). Optically, the barrier layer preferably has high transmittance in the visible wavelength range so as not to affect the optical properties of the overlying coating. In applications where the overlying coating is electroconductive, the barrier layer is preferably not electroconductive. If the overlying coating is subject to partial etching, e.g. to produce a circuit, it is recommended that the barrier layer not be soluble in the etchant, often hydrochloric acid. If the refractive index of the barrier layer matches the refractive index of the substrate as closely as possible, as with the use of a silica barrier layer, for a soda-lime-silica glass substrate, a thicker barrier layer e.g. as described in U.S. Pat. No. 4,238,276 can be applied for greater effectiveness without a great loss of visible light transmission or other is undesirable optical effects. However, when the refractive index of the barrier layer does not match the refractive index of the substrate, a thinner barrier layer is preferred to prevent loss of visible light. As will be appreciated, the barrier layers or films of the invention are thin, stable, not soluble in most etchants and/or optically acceptable e.g. the film does not decrease the transmission of the substrate when the film is directly coated on the substrate more than 10% of the transmission measured at 550 nanometers and preferably 5%.

Glass substrates of conventional soda-lime-silica composition formed by a float process are preferred in the practice of the invention; however, as will be appreciated, the barrier layers of the invention are not limited thereto and may be used with any type of substrate, provided the barrier layers of the invention prevent or minimize migration of alkali metal ions e.g. sodium ions. Further, the barrier layers of the invention may be used to prevent or minimize alkali metal ion migration from glass into mediums even when the glass is subjected to elevated temperatures e.g. a temperature as high as 1100° F. (593° C.)

Figure 1:
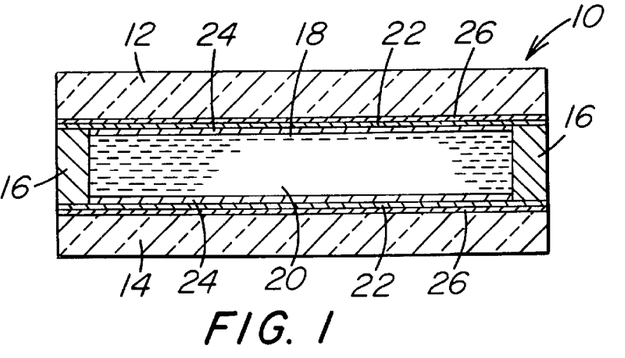
FIG. 1 is a cross section of a liquid crystal display ("LCD") device incorporating features of the invention.

With reference to FIG. 1, LCD device 10 is similar to the type disclosed in U.S. Pat. No. 5,165,972 and includes opposed glass sheets 12 and 14 separated by peripheral seal 16 to define a chamber 18 containing liquid crystal material 20. Each of the sheets 12 and 14 carries a transparent barrier layer or film 22 of the invention sputtered on the glass sheets or substrates in accordance with the invention. An electroconductive coating 24 is over the barrier layer 22. An alignment layer 26 is over the electroconductive coating 24 in contact with the liquid crystal material 20. The light transmitting properties of the liquid crystal material 20 may be controlled by application of a potential difference between the electroconductive layer 24 on the glass sheets 12 and 14.

Figure 2:
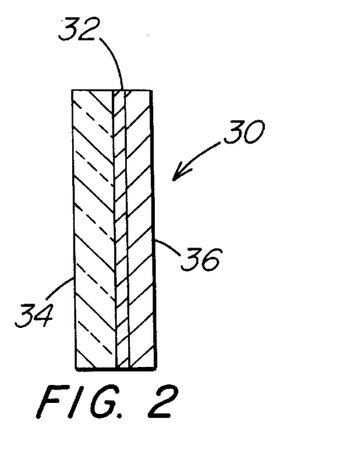
FIG. 2 is a cross section of a glass sheet having the barrier layer of the invention between a photocatalytic composition and a glass substrate.

The barrier layer of the instant invention can also be used to prevent deterioration of photocatalytic compositions, e.g. of the type described in International Application Publication No. WO 95/11751. With reference to FIG. 2, there is shown an article 30 having barrier layer 32 of the invention between glass substrate 34 and a composition 36 of titanium dioxide particles in a silicone binder.

As can be appreciated, the LCD display 10 and article 30 described above are not limiting to the invention and are presented to illustrate two environments in which the barrier layer of the instant invention can be used.

The invention contemplates the use of metal oxide barrier layers such as, but not limited to, zirconium oxide, titanium oxide and zinc/tin oxide films are useable as barrier layers. The preferred metal oxides in the practice of the invention include but are not limited to zirconium oxide and titanium oxide because they are found to be more effective at thicknesses as low as 20 to 120 Angstroms, are optimally effective at thicknesses in the range of 30 to 60 Angstroms and less soluble in etchants than zinc/tin oxide and are less soluble in etchants than zinc/tin oxide. The metal oxide barrier layers of the present invention are preferably deposited by, but not limited to, magnetron sputtering of a metal target in an oxidizing atmosphere in a manner discussed below.

Metal oxide films such as titanium oxide, zirconium oxide and zinc/tin oxide are usually amorphous when deposited as thin films e.g. films having a thickness less than about 180 Angstroms. Amorphous films have no grain boundaries and therefore are expected to be acceptable as barrier layers to prevent migration of alkali metal ions e.g. sodium ions. However, it is believed for reasons discussed below that amorphous films are more effective as barrier layers as their density increases. For example, titanium oxide films having a thickness in the range of about 45 to about 180 Angstroms are effective as barrier layers when the amorphous titanium oxide films have densities equal to or greater than about 90% of its crystalline density i.e. densities equal to or greater than about 3.80 grams per cubic centimeter; are more effective as barrier layers when the amorphous titanium dioxide films have densities equal to or greater than about 95% of its crystalline density, i.e. densities equal to or greater than about 4.0 grams per cubic centimeter, and are still more effective as the density of the amorphous titanium oxide film approaches its crystalline density i.e. approaches a density of about 4.2 grams per cubic centimeter.

Zirconium oxide films having a thickness in the range of about 30 to about 120 Angstroms are effective barrier layers when the amorphous zirconium oxide films have densities equal to or greater than about 90% of its crystalline density, e.g. densities equal to or greater than about 5 grams per cubic centimeter; are more effective as barrier layers when the amorphous zirconium oxide films have densities equal to or greater than about 95% of its crystalline density, i.e. densities equal to or greater than about 5.3 grams per cubic centimeters, and are still more effective as the density of the amorphous zirconium oxide film approaches its crystalline density, i.e. approaches a density of about 5.6 grams per cubic centimeter.

Zinc/tin oxide films having a thickness in the range of about 60 to about 120 Angstroms are effective barrier layers when the amorphous zinc/tin oxide films have densities equal to or greater than about 90% of its crystalline density, e.g. densities equal to or greater than about 5.7 grams per cubic centimeter; are more effective as barrier layers when the amorphous zinc/tin oxide films have densities equal to or greater than about 95% of its crystalline density, i.e. densities equal to or greater than about 6.1 grams per cubic centimeter, and are still more effective as the densities of the amorphous zinc/tin oxide film approaches its crystalline density, e.g. approaches a density of about 6.38 grams per cubic centimeter.

In the foregoing discussion reference was made to specific metal oxide e.g. titanium oxide, zirconium oxide and zinc/tin oxide. As can be appreciated, the metal oxide may be oxides or sub oxides of the metal. Therefore, when the term titanium oxide, zirconium oxide or zinc/tin oxide are used, they refer to the oxides of titanium, zirconium or zinc/tin present in a sputtered titanium oxide film, zirconium oxide film or zinc/tin oxide film respectively.

Although there are various techniques for determining the density of a thin film coating, the following technique is preferred. The thickness of the film is determined using a stylus profilometer. X-ray fluorescence technique is used to determine weight per unit area of the film. The thickness of the film measured using the stylus profilometer in Angstroms is converted to centimeters and divided into the weight per unit area determined using the X-ray fluorescence technique in micrograms per square centimeter and converted to give density of the film in grams per cubic centimeter.

Figure 3:
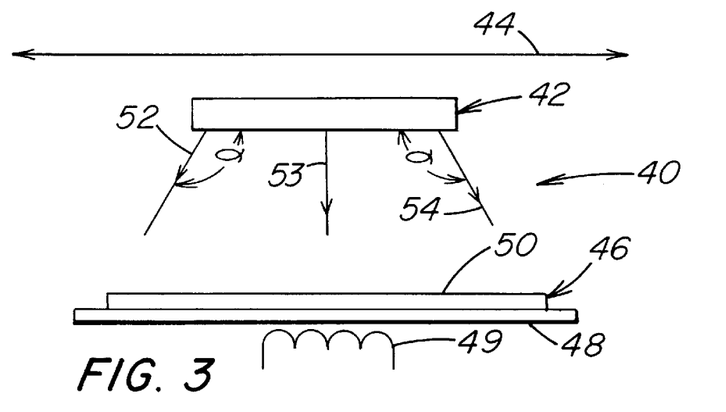
FIG. 3 is a side view of a sputtering apparatus having the chamber walls removed to show the path of the cathode housing relative to a glass substrate to be sputter coated.

The discussion will now be directed to coating a glass substrate to provide a metal oxide barrier layer of the instant invention, i.e. an amorphous film having a density of at least 90% of its crystalline density. With reference to FIG. 3, magnetic vacuum sputter arrangement 40 had a cathode housing 42 mounted within a chamber (not shown) to move along a reciprocating path designated by the number 44. A glass substrate 46 was mounted on a stationary support 48. The glass was heated by heater 49 to a temperature of about 200° F. (93.3° C.). As the sputtered material moves away from the housing 42, it moves in all directions; however for this discussion and to simplify the discussion, it is considered to move to the left as shown by travel path 52, downward as shown by travel path 53 and to the right as shown by travel path 54 away from the housing 42 as viewed in FIG. 3. In the practice of the invention the cathode was a zirconium metal cathode sputtered in a 50/50 percent argon/oxygen atmosphere.

The zirconium oxide moving along travel paths 52, 53 and 54 was deposited on surface 50 of the glass substrate. As viewed in FIG. 3, as the housing 42 moves to the left, the material moving along the path 52 leads the housing, and as the housing moves to the right, the material moving along the path 54 leads the housing. The material traveling along path 53 does not lead or follow the housing. The material traveling along the paths 52 and 54 has a low grazing angle which is shown in FIG. 3 as angle α which bound by the plane of the housing and the path 52 or 54. It is believed the arrangement shown in FIG. 3 deposited a thin zirconium oxide film having a density less than 90% of its crystalline density, i.e. less than about 5 grams per cubic centimeter.

Figure 4:
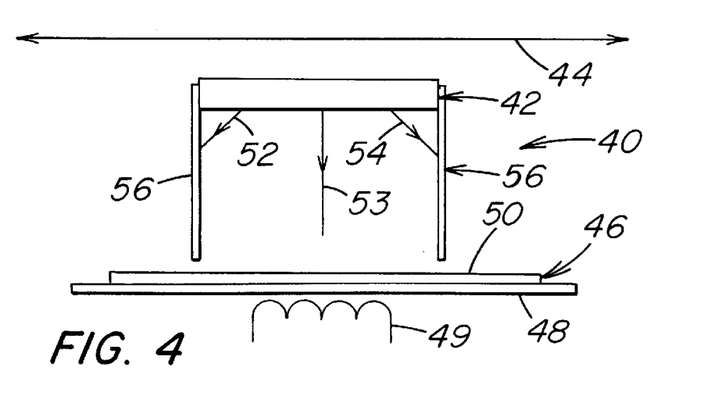
FIG. 4 is a view similar to the view of FIG. 3 showing shields on the cathode housing in accordance to the invention.

With reference to FIG. 4, there is shown the apparatus 40 modified in accordance to the invention. More particularly, aluminum shields 56 were provided on the leading and trailing sides of the housing. The aluminum shields extended down toward the surface of the glass substrate 46 but did not contact the surface 50. Thin layers of metal oxide films coated using the arrangement shown in FIG. 4 are expected to be effective barriers against sodium ion migration because the amorphous films deposited using the arrangement in FIG. 4 have a density greater than about 90% of its crystalline density, e.g. greater than about 5 grams per cubic centimeter.

In the practice of the invention glass substrates 12 inches (0.30 meter) by 12 inches (0.30 meter) were coated in an apparatus of the type shown in FIG. 4. The heater 49 heated the glass substrates to about 200° F. (93.7° C.). The glass substrates were cleaned by first polishing the surface to be coated with cerium oxide and thereafter, thoroughly rinsed in water. The glass substrate was thereafter rinsed in a 50/50 by volume 2(iso)-propanol deionized water mixture. The effectiveness of the zirconium oxide barrier layer was determined by silver ion exchanging the barrier layer for sodium ions that penetrated the barrier layer, and then measuring the silver ion concentration using X-ray fluorescence. The silver ion concentration (which is proportional to the sodium concentration) was determined by counting the net intensity (NI) of the silver emission line, Ag(NI). The silver counts per second (Ag(CPS)) was determined by counting Ag(NI) for a period of 40 seconds. Stated another way, the Ag(CPC) is Ag(NI) counts per 40 seconds.

To provide a reference for sodium concentration the Ag(NI) for coated glass was compared to the Ag(NI) of uncoated glass. The background level of the X-ray spectrometer gave an Ag(NI) of approximately 16,000 which indicates zero silver concentration and therefore zero sodium concentration. The optimum barrier layers should, therefore, preferably have a Ag(NI) near this value, i.e. an Ag(NI) of 16,000 or counts per second (CPS) of 400.

Each coated substrate was cut into three 1⅜ inch (4.5 centimeter) square pieces. One piece from the substrate was not heated, one piece was heated at 700° F. (371.1° C.) for one hour, and one piece was heated at 900° F. (482° C.) for one hour. The heated pieces were cooled to room temperature, and the barrier layer of each piece was prepared for ion exchange which included applying a eutectic 62 mol % potassium nitrate and 38 mol % silver nitrate solution to the coated surface of the pieces, and heating the pieces for 1 hour at about 150° C. Prior to applying the eutectic solution, the pieces were preheated to 150° C. for 15 minutes, and the eutectic applied to the heated piece. The solution was captured on the surface by providing a boundary around the edge of the pieces with tape sold under the trademark Teflon. The Teflon tape was applied before the pieces were preheated. The solution was applied evenly covering the exposed coated surface to a thickness of about 0.100 inch (0.254 cm). After heating the pieces having the eutectic solution, the glass pieces were removed from the oven and the solution was allowed to cool and harden. The hardened solution was then thoroughly rinsed off with water. The pieces were then dipped in nitric acid to remove the residual silver film on the glass surface and rinsed to remove the silver nitrate residue resulting from the silver reaction with the nitric acid. X-ray fluorescence analysis was then made of the silver ion exchanged pieces to determine the sodium migration.

The following table provides particulars for the pieces A–L coated and ion exchanged in the above manner and the effectiveness of the zirconium oxide barrier. Column (1) of the table lists the piece no.; column (2) lists the no. of passes made by the zirconium oxide cathode, one pass is movement in one direction along the reciprocity path 44 (see FIGS. 3 and 4); column (3) lists the current applied to the cathode during sputtering in amperes; column (4) lists the voltage applied to the cathode during sputtering in volts; column (6) is the percent transmission of the coated pieces in the visible range (note: transmission was not measured for pieces F and H for reasons not now known); column (7) lists the thickness of the films in Angstroms measured using the net intensity of the zirconium emission from X-ray fluorescence calibrated against thickness of zirconium oxide film measured using an angstrometer; columns (8), (9) and (10) list the Ag(NI) readings for the unheated and heated pieces. The notes * and  identify the process for manufacturing the glass substrate and its thickness and note * identifies the % transmission for the uncoated pieces. The transmission values given on the table were measured at 550 nanometers. As was discussed above, optimum barriers have Ag(NI) reading of about 16,000 (400 CPS); however, as can be appreciated, depending on the degree of alkali metal ion penetration that can be had without deterioration of the medium is the level desired, and therefore the number of Ag(NI) is not limiting to the invention.

The Ag(NI) for unheated piece F has the highest reading. It is believed that the film was not as dense as expected perhaps due to preparation of the substrate for coating. The Ag(NI) for pieces E, F, G, J and K in columns (9) and (10) appear high. It should be noted that the corresponding unheated pieces F, G, J and K in column (7) are also high indicating that the film was not effected perhaps for the reason stated above.

It should be noted that even though zirconium oxide has an index of refraction higher than the glass substrate, the zirconium oxide was sufficiently thin that the transmission of the coated piece decreased less than 2%.

A glass substrate was prepared as discussed above and was coated using the coating arrangement shown in FIG. 3 (without the shield 56 shown in FIG. 4). The zirconium oxide film had a thickness of 233 Angstroms. The coated substrate was cut into 1⅜ inch (4.5 centimeter) square pieces. One piece was heated at 300° F. (149° C.) for 1 hour and thereafter ion exchanged as discussed above; the piece had a Ag(NI) reading of 60,000. Another piece was heated at 500° F. (260° C.) for 1 hour and thereafter ion exchanged as discussed above; the piece had a Ag(NI) reading of 145,000. Another piece was heated at 750° F. (399° C.) for 1 hour and thereafter ion exchanged as discussed above; the piece had a Ag(NI) reading of 155,000. A fourth piece was heated to 900° F. (482° C.) for 1 hour and thereafter ion exchanged; the piece had an Ag(NI) reading of 180,000. The performance of zirconium oxide barrier layer deposited without the use of the shields (see FIG. 4) was significantly better than the zirconium oxide barrier layer deposited without the shields (see FIG. 3). It is believed that the improved performance of zirconium oxide as a barrier layer was the zirconium oxide film deposited using the apparatus in FIG. 4 was an amorphous zirconium oxide film having a density equal to or greater than 90% of its crystalline density.

The following Examples 1–12 were coated using an Airco ILS 1600 coater. The coater had a stationary housing having the metal cathode and a conveyor to move a glass substrate under the housing. The glass substrate moved through a coating zone bound by walls. The walls act in a similar manner as the shields 56 shown in FIG. 4. Example 13 was coated using the arrangement shown in FIG. 4 discussed above.

To measure the effectiveness of the barrier layer deposited on the samples at preventing alkali metal diffusion, the barrier layer coated glass samples were heated at about 575°

TABLE

| (1) Piece No. | (2) No. of Cathode Passes | (3) Current (Amps) | (4) Voltage (Volts) | (5) Substrate | (6) Percent Transmission of coated piece*** | (7) Thickness of Film (Angstroms) | Ag (NI) Readings | | |
|---|---|---|---|---|---|---|---|---|---|
| | | | | | | | (8) No Heat | (9) Heating at 700° F. for 1 hour | (10) Heating at 900° F. for 1 hour |
| A | 4 | 10 | 310 | Flt* | 88.9 | 72.5 | 15,786 | 17,942 | 17,237 |
| B | 4 | 10 | 310 | Flt | 88.9 | 79.0 | 15,988 | 16,473 | 17,398 |
| C | 2 | 15 | 325 | Flt | 89.8 | 50.5 | 15,966 | 16,026 | 16,872 |
| D | 3 | 10 | 310 | Flt | 89.5 | 61.0 | 15,924 | 17.830 | 17,327 |
| E | 3 | 10 | 300 | Flt | 89.5 | 60.0 | 16,976 | 27,169 | 30,770 |
| F | 2 | 10 | 310 | Flt | | 45.0 | 23,343 | 32,208 | 36,534 |
| G | 3 | 15 | 325 | Flt | 89.2 | 72.5 | 18,991 | 25,444 | 31,826 |
| H | 4 | 15 | 325 | Flt | | 90.0 | 16,169 | 17,382 | 16,517 |
| I | 4 | 10 | 305 | S** | 90.7 | 67.0 | 15,868 | 17,977 | 17,126 |
| J | 3 | 10 | 325 | S | 90.8 | 54.0 | 17,759 | 23,337 | 17,863 |
| K | 3 | 10 | 310 | S | 90.9 | 53.0 | 17,841 | 19,969 | 20,313 |
| L | 2 | 10 | 310 | S | 91.0 | 44.0 | 16,483 | 16,006 | 32,777 |

*Flt - .125" Float Glass
**S - .050" Flachglas Sheet Glass
***Transmission for uncoated float glass is 90%
Transmission for uncoated sheet glass is 91.3%

C. for 10 and 20 minutes to promote alkali metal migration from the glass substrate. After the samples were cooled to ambient temperature. Thereafter the ion exchange procedure discussed above was used except the samples having the eutectic solution were heated for 2 hours at 150° C. The coated surfaces were then analyzed by X-ray fluorescence to measure the amount of silver present, which is proportional to the amount of sodium which diffused into the coating from the glass. The silver ion concentration was measured as Ag(CPS). For comparison, unheated coated samples were ion-exchanged and the silver measured for a background count, as were unheated and heated uncoated glass samples.

When the barrier layer is zirconium oxide, the thickness is preferably in the range of 20 to 120 Angstroms, more preferably 20 to 90 Angstroms, particularly 30 to 60 Angstroms, and most particularly 50 to 60 Angstroms, and the film has a density equal to or greater than 5 grams per cubic centimeter. When the barrier layer is titanium oxide, the thickness is preferably in the range of 20 to 90 Angstroms, preferably 30 to 90 Angstroms, particularly 45 to 90 Angstroms and most particularly 50 to 60 Angstroms, and the film has a density equal to or greater than 3.8 grams per cubic centimeter. When the barrier layer is zinc/tin oxide, the thickness is preferably in the range of 60 to 120 Angstroms and preferably 60 to 90 Angstroms, and the film has a density of equal to or greater than 5.7 grams per cubic centimeter. As can be appreciated, a thin barrier layer is preferred so not to lower the optical transmission.

In a particularly preferred embodiment of the present invention, the barrier layer is overcoated with a coating of electroconductive metal oxide for use in a liquid crystal display. Preferred electroconductive metal oxide coatings include indium oxide, tin oxide, indium/tin oxide and zinc/aluminum oxide. A particularly preferred electroconductive coating is indium/tin oxide, commonly referred to as ITO. The indium/tin oxide coating preferably used in a liquid crystal display device usually has an electrical resistance of about 300 ohms per square. The indium/tin oxide coating is preferably deposited over the barrier layer by magnetron sputtering. Electroconductive metal is oxide films may be deposited by sputtering a metal cathode target in an oxidizing atmosphere, or by sputtering of ceramic metal oxide targets.

The present invention will be further understood from the descriptions of specific examples which follow.

EXAMPLES 1 TO 4

Figure 5:
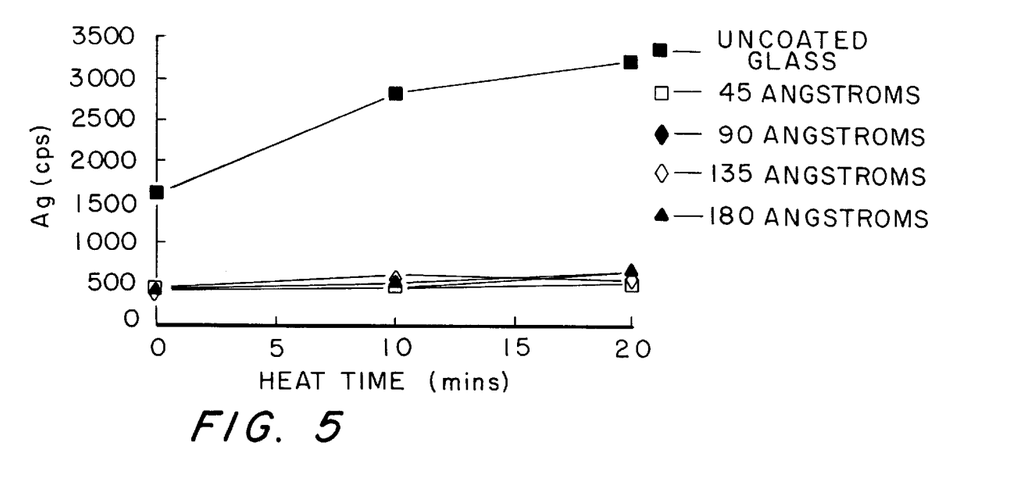
FIG. 5 illustrates the effectiveness at minimizing alkali metal migration of a titanium oxide barrier layer at thicknesses of 45, 90, 135 and 180 Angstroms (Examples 1 to 4), compared with uncoated glass.

Soda-lime-silica float glass samples having a glass substrate thickness of 2.3 millimeters and a visible light transmittance (measured at 550 nanometers) of 91.3 percent were coated with titanium oxide barrier layers as follows. A planar titanium target was magnetron sputtered at 8.5 kilowatts, 520 volts in an atmosphere of 50 percent argon and 50 percent oxygen. The glass substrates were conveyed past a stationary cathode at a rate of 53 inches (1.35 meters) per minute. Titanium oxide barrier layers having thicknesses of 45, 90, 135 and 180 Angstroms were deposited by passing the glass substrates under the target 1, 2, 3 and 4 times respectively (examples 1 to 4 respectively). The visible light transmittances (measured at 550 nanometers) of the titanium oxide coated glass substrates were 90.8 percent at 45 Angstroms, 89.4 percent at 90 Angstroms, 87.3 percent at 135 Angstroms and 84.8 percent at 180 Angstroms (Examples 1 to 4 respectively). The titanium oxide coated glass substrates were heated at 575° C. for either 10 or 20 minutes, then ion-exchanged with silver to replace any diffused sodium with silver. The silver was then measured by X-ray fluorescence. A comparison of the effectiveness of the titanium oxide barrier layer at thicknesses up to 180 Angstroms is shown in FIG. 5.

EXAMPLES 5 TO 8

Figure 6:
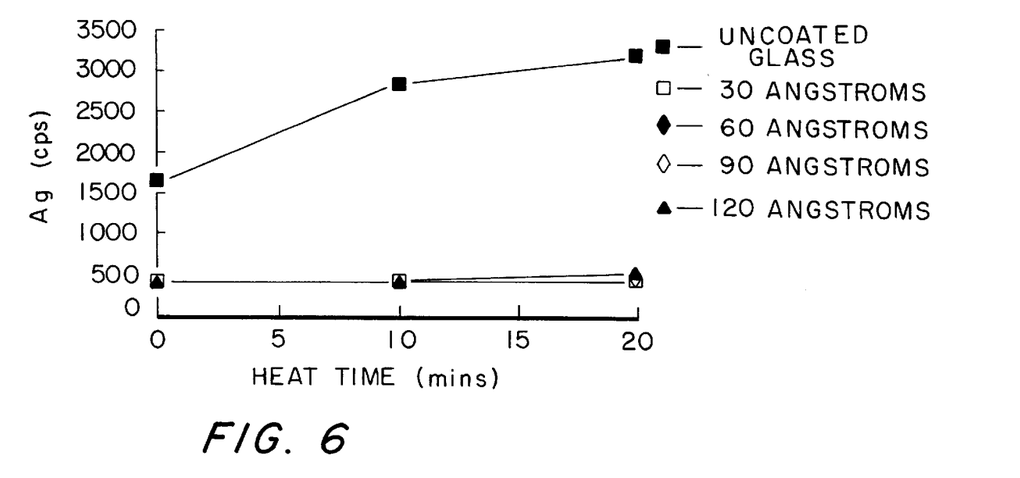
FIG. 6 illustrates the effectiveness of a zirconium oxide barrier layer at thicknesses of 30, 60, 90 and 120 Angstroms (Examples 5 to 8), compared with uncoated glass.

Soda-lime-silica float glass samples having a thickness of 2.3 millimeters and a visible light transmittance of 91.3 percent were coated with zirconium oxide barrier layers as follows. A planar zirconium target was magnetron sputtered at 6.5 kilowatts, 374 volts in an atmosphere of 50 percent oxygen and 50 percent argon. Since zirconium sputters faster than titanium, the glass substrates were conveyed past the stationary cathode at a rate of 190 inches (4.8 meters) per minute to deposit zirconium oxide barrier layers having thicknesses of 30, 60, 90 and 120 Angstroms respectively from 1, 2, 3 or 4 passes (examples 5 to 8 respectively). The visible light transmittance of the glass substrate with the thickest zirconium oxide barrier layer (example 8 at 120 Angstroms) was 90.2 percent. The zirconium oxide coated glass substrates were heated and silver ion exchanged as in the previous examples. FIG. 6 shows the effectiveness of the zirconium oxide barrier layers at thicknesses from 30 to 120 Angstroms.

COMPARATIVE EXAMPLES 9 TO 12

Figure 7:
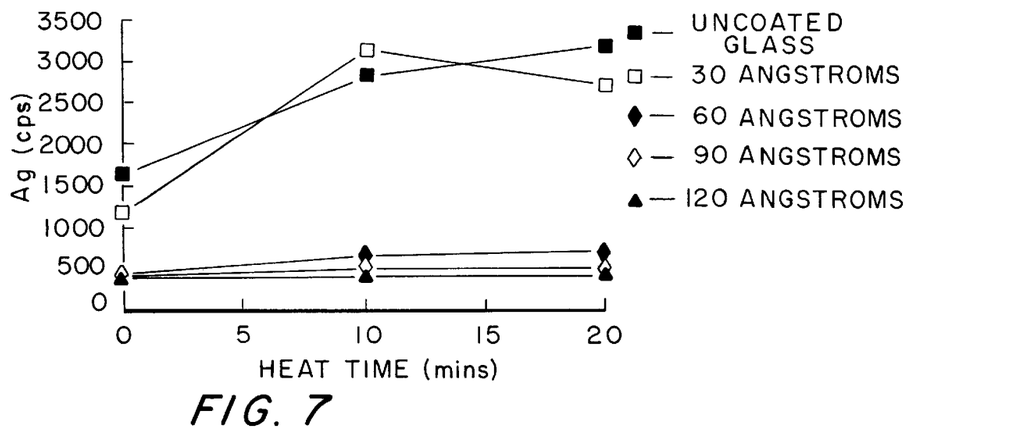
FIG. 7 illustrates the comparative performance as a barrier layer at thicknesses of 30, 60, 90 and 120 Angstroms of zinc/tin oxide (Comparative Examples 9 to 12), compared with uncoated glass.

For comparison, soda-lime-silica float glass samples having a thickness of 2.3 milliliters were coated with zinc/tin oxide. A planar target comprising 52.4 weight percent zinc and 47.6 weight percent tin was magnetron sputtered at 0.78 kilowatts, 386 volts in an atmosphere of 50 percent argon and 50 percent oxygen. The glass substrates were conveyed at a rate of 190 inches (4.8 meters) per minute to deposit zinc/tin oxide coatings of 30, 60, 90 and 120 Angstroms thickness from 1, 2, 3 and 4 passes respectively (examples 9 to 12 respectively). The transmittance of the glass substrate with the thickest zinc/tin oxide coating (example 12 at 120 Angstroms) was 90.7 percent. The zinc/tin oxide coated glass substrates were heated, silver ion-exchanged and measured by X-ray fluorescence as in the previous examples. FIG. 7 shows that a thin zinc/tin oxide layer is not an effective sodium diffusion barrier, and that the effectiveness of zinc/tin oxide as a sodium diffusion barrier is a function of increasing thickness.

EXAMPLE 13

A zirconium oxide barrier layer was deposited on a sheet of glass 0.048 inch (1.2 millimeters) thick by sputtering a zirconium cathode in an argon/oxygen atmosphere at a deposition rate of 7.8 Angstroms per second of zirconium oxide. In three passes of the cathode at a rate of 2 inches per second (3.05 meters per minute), a zirconium oxide barrier layer 55±5 Angstroms thick was deposited, decreasing the transmittance of the glass substrate by about 0.5 to 1 percent. Onto the zirconium oxide barrier layer was deposited a layer of indium/tin oxide at the same glass speed. Three passes of a cathode target comprising 90 weight percent indium and 10 weight percent tin produced an indium/tin oxide coated glass substrate with a surface resistance of about 300 ohms per square and a transmittance of about 83.6 percent.

Figure 8:
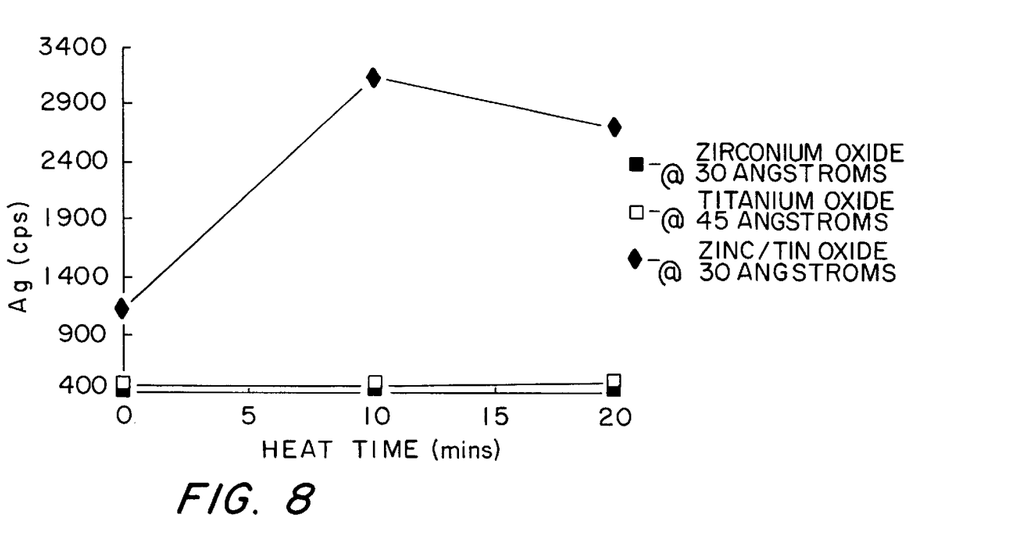
FIG. 8 compares the effectiveness as barrier layers of titanium oxide, zirconium oxide and zinc/tin oxide at thicknesses of 45, 30 and 30 Angstroms respectively (Examples 1, 5 and 9).
Figure 9:
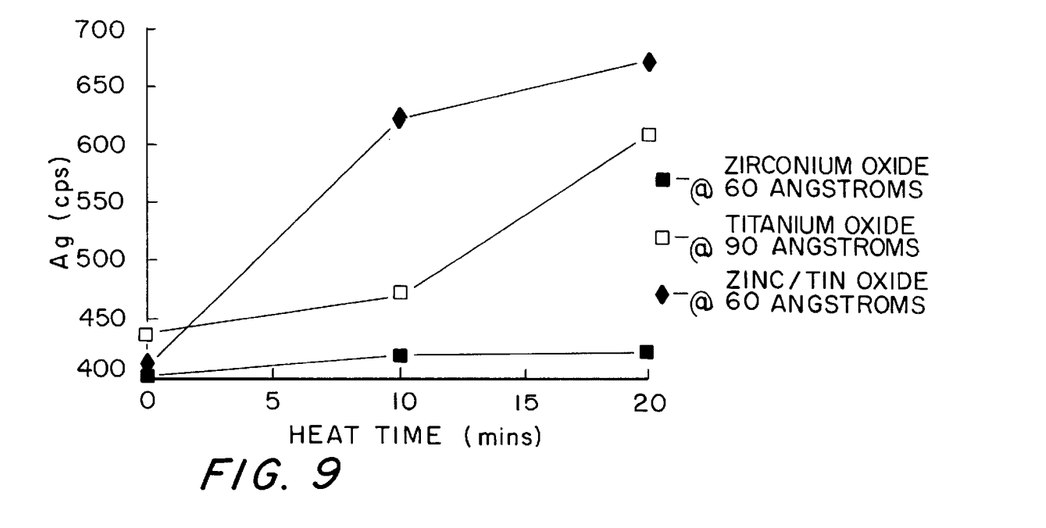
FIG. 9 compares the effectiveness as barrier layers of titanium oxide, zirconium oxide and zinc/tin oxide at thicknesses of 90, 60 and 60 Angstroms respectively (Examples 2, 6 and 10).
Figure 10:
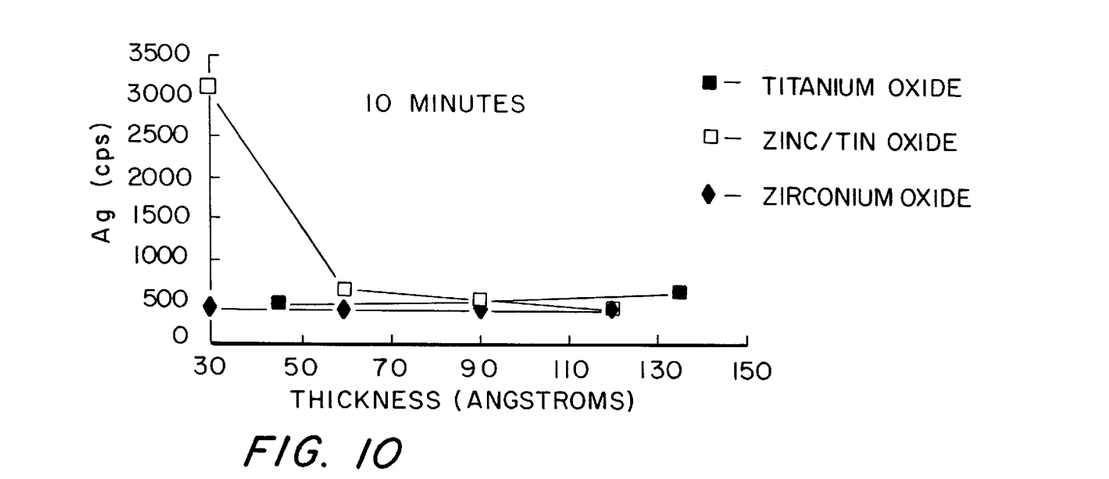
FIG. 10 shows the effectiveness of barrier layers of titanium oxide, zirconium oxide and zinc/tin oxide as a function of barrier layer thickness (information from FIGS. 5–9).

FIGS. 8–10 show further comparison of the examples of selected thickness to show the effectiveness of the barriers of the invention.

The above examples are offered to illustrate the barrier layers of the present invention. Other metal oxides which effectively prevent alkali metal migration at similarly low thicknesses are within the scope of the invention, along with methods of deposition other than magnetron sputtering. The overlying coating may be a single layer or multiple layers of various metals, metal oxides and/or other metal compounds including silicon-containing coating layers. The time and temperature heating cycles described herein only illustrate a useful test procedure for determining relative barrier layer effectiveness. The scope of the present invention is defined by the following claims.

What is claimed is:

1. A method of depositing a metal oxide barrier film over a glass substrate surface comprising the steps of:
   providing a sputter coating station, the sputter station comprising:
      a generally horizontal path of travel, and
      a sputter coating chamber above the path, the sputter chamber comprising:
         a cathode target above the path, and
         a shield on one side of the cathode target extending downward toward the path defined as a first shield and a shield on the opposite side of the cathode target extending downward toward the path defined as a second shield;
   positioning said glass substrate on the path of travel;
   energizing the cathode target in an oxidizing atmosphere to direct sputtered metal toward the path of travel;
   moving the substrate and coating chamber relative to one another to pass the substrate under the first shield, under the cathode target and under the second shield;
   coating the metal oxide barrier film over the substrate surface when the glass substrate is between the first shield and the second shield, said barrier film providing effective diffusion barrier of alkali metal ions from the glass substrate.

2. The method according to claim 1, wherein the barrier film is an amorphous zirconium oxide having a thickness between 30 and 120 Angstroms and a density equal to or greater than 5.0 grams per cubic centimeter.

3. The method according to claim 1, wherein the barrier film is an amorphous titanium oxide having a thickness in the range of 45 to 180 Angstroms and a density greater than 3.8 grams per cubic centimeter.

4. The method according to claim 1, wherein the barrier film is a zinc/tin oxide having a thickness in the range of 60 to 120 Angstroms and a density of 5.7 grams per cubic centimeter.

5. The method according to claim 1, wherein only sputtered metal traveling along a path generally normal to the substrate surface is deposited on the substrate surface.

6. The method according to claim 1 wherein the film is a titanium oxide layer having a thickness in the range of about 45 to 180 angstroms.

7. The method according to claim 1 wherein the film is titanium oxide layer having a density equal to or greater than 3.8 grams per cubic centimeter.

8. The method according to claim 6 wherein the titanium oxide layer has a thickness of 90 to 180 angstroms.

9. The method according to claim 1 wherein the layer is a zinc/tin oxide film.

10. The method according to claim 9 wherein the zinc/tin oxide layer has a density of 5.7 grams per cubic centimeter.

11. The method according to claim 9 wherein the zinc/tin oxide layer has a thickness of 90 to 120 angstroms.

12. The method according to claim 1 wherein the film is a zirconium oxide layer.

13. The method according to claim 12 wherein the density of the zirconium oxide layer is equal to or greater than 5.0 grams per cubic centimeter.

14. The method according to claim 12 wherein the thickness of the zirconium oxide layer is in the range of 30 to 60 angstroms.

15. The method according to claim 1 further including the step of providing over the barrier film an electroconductive coating selected from the group consisting of indium oxide, tin oxide, indium/tin oxide and zinc aluminum oxide.

16. The method according to claim 1 further comprising the step of providing over the barrier film a liquid crystal.

17. The method according to claim 1 further including the step of providing over the barrier film an electrolyte.

18. The method according to claim 1 wherein the moving step includes moving the cathode target over the surface of the substrate.

19. The method according to claim 1 wherein the film is an amorphous film having a density of at least 90% of its crystalline density.

20. The method according to claim 1 wherein the first and second shields are made of aluminum.

* * * * *